United States Patent

Hajbi et al.

[11] Patent Number: 5,829,473
[45] Date of Patent: Nov. 3, 1998

[54] MULTI PURPOSE VALVE

[75] Inventors: Yeheskiel Hajbi, Moshav Nir; Yizhar Bahir; Giora Naor, both of Kibbutz Dorot, all of Israel

[73] Assignee: Dorot Valve Manufacturers, Hof Ashkelon, Israel

[21] Appl. No.: 838,035

[22] Filed: Apr. 22, 1997

[30] Foreign Application Priority Data

Apr. 30, 1996 [IL] Israel ......................................... 118083

[51] Int. Cl.⁶ .......................... F16K 43/00; F16K 31/126
[52] U.S. Cl. ......................... 137/315; 251/61.2; 251/61.4; 251/61.5; 137/556
[58] Field of Search ........................ 251/28, 61.2, 61.3, 251/61.4, 61.5, 25, 45, 46; 137/556

[56] References Cited

U.S. PATENT DOCUMENTS

| | | | |
|---|---|---|---|
| 843,382 | 2/1907 | Witt | 251/61.4 |
| 892,788 | 7/1908 | Wilkins | 251/61.3 |
| 1,076,146 | 10/1913 | Noyes | 251/61.2 |
| 1,268,597 | 6/1918 | Montreuil | 251/61.2 |
| 2,602,467 | 7/1952 | Griswold | 251/61.2 |
| 2,661,023 | 12/1953 | Griswold | 251/61.2 |
| 2,710,162 | 6/1955 | Snoody | 251/61.2 |
| 2,805,774 | 9/1957 | Griswold | 137/414 |
| 2,911,994 | 11/1959 | Branson | 137/270 |
| 3,689,025 | 9/1972 | Kiser | 251/61.4 |
| 3,743,237 | 7/1973 | Kiser | 251/61.5 |
| 3,982,558 | 9/1976 | Ochs | 251/61.2 |
| 4,044,787 | 8/1977 | Sutherland | 251/61.4 |
| 4,208,031 | 6/1980 | Jonak | 251/61.2 |

FOREIGN PATENT DOCUMENTS

| | | | |
|---|---|---|---|
| 1086098 | 7/1960 | Germany | 251/61.4 |
| 2241551 | 8/1974 | Germany | 251/61.2 |
| 1095127 | 12/1967 | United Kingdom . | |
| 1263177 | 2/1972 | United Kingdom | 251/61.5 |
| 1373815 | 11/1974 | United Kingdom | 251/61.4 |

OTHER PUBLICATIONS

Chaplinskii, A. V., "Pneumatic Diaphragm Actuating Mechanisms", Instrumentation and Control, No. 9, pp. 27–31, Sep. 1970.

Primary Examiner—George L. Walton
Attorney, Agent, or Firm—Browdy and Neimark

[57] ABSTRACT

A hydraulic control valve comprising a housing fitted with an inlet port and an outlet port, a sealing port intermediate the inlet port and the outlet port, dividing the housing into an inlet chamber and an outlet chamber with a diaphragm sealingly dividing the outlet chamber and forming a first control chamber at one side of the diaphragm and comprising a first control port. A stem is connected to the diaphragm and is axially displaceable within the housing and a sealing member is fixed to the stem and is shiftable between a first position in which the sealing port is open and a second position in which the sealing port is closed. The housing further comprises a releasably retained partition plate sealingly dividing the outlet chamber so as to form a second control chamber at a second side of the diaphragm and a second control port, the plate having an opening for slidingly and sealingly supporting the stem. The valve is operable in either a first operative mode where the partition plate is removed from the housing and the second control port is sealed, or a second operative mode where the partition plate is retained within the housing and the second control port is aired.

22 Claims, 7 Drawing Sheets

MULTI PURPOSE VALVE

FIELD OF THE INVENTION

The present invention is in the field of hydraulic control valves and more specifically it is concerned with diaphragm activated control valves of the type which may be converted to be used as the so-called "single chamber" wherein a single pressure chamber is provided at one side of the diaphragm, and the "double chamber" valve wherein the valve comprises two pressure chambers, typically one above the diaphragm and one below.

BACKGROUND OF THE INVENTION

The single chamber hydraulic valve is typically used as a pressure maintenance device in a pressurized liquid line, which may be opened or closed by a suitable hydraulic or pneumatic control signal. Such single chamber control valves also provide that pressure drop in the line entails automatic closure of the valve until the minimal predetermined pressure threshold is re-built in the line. Such a device is used, for example, when it is required to restrict fluid discharge rate depending on the pressure of the liquid in a supply line. However, at essentially low pressurized supply lines, a double chambered type valve is required. Such a valve is also used when a check-valve is required.

In order to avoid replacing a single chamber type valve by a double chamber type valve, there have been provided control valves which by some insight modifications, enable converting a valve from a single chamber type valve to a double chamber type valve and vice versa, as may be required for different applications, making the valves suitable for use in a variety of applications.

One such type of modifiable control valves comprises a housing with a water inlet and a water outlet, with a double chambered diaphragm actuator, the diaphragm dividing the actuator into two pressure chambers, one acting above the diaphragm and one below. Both pressure chambers comprise control ports, and the lower pressure chamber further comprises also a sealable opening leading to the outlet of the valve, whereby when the valve is used as a single chamber valve, the opening of the lower chamber is opened, whereby only the upper control chamber is active. However, when it is required to use the control valve as a double chambered valve, the opening of the lower pressure chamber is open allowing flow communication with the water outlet.

One disadvantage of the above arrangement is that the construction of the housing is such that it always comprises a first and a second chamber, the latter being opened or sealed by a plug, thus forming a single or a double chamber valve, respectively. This is an expensive structure which also requires special sealing means for slidingly retaining the actuator stem, such sealing means being subject to excessive wear and malfunctioning owing to scale and dirt.

Furthermore, servicing the operational components of the valve requires dismounting practically the entire valve. Even more so, the construction of the valve by such an arrangement is essentially heavy at both the configurations.

It is the object of the present invention to provide a new and improved hydraulic control valve convertible to be a single or a double chambered valve, wherein the above-referred to disadvantages are substantially reduced or overcome.

BRIEF SUMMARY OF THE INVENTION

According to the present invention, there is provided a hydraulic control valve comprising:

- a housing having an inlet port for connecting to a pressurized fluid supply line, and an outlet port for connecting to an outlet line;
- a sealing port intermediate the inlet port and the outlet port, dividing the housing into an inlet chamber and an outlet chamber;
- a diaphragm sealingly dividing the outlet chamber and forming a first control chamber at one side of the diaphragm and comprising a first control port;
- a stem articulately supported to the diaphragm and being axially displaceable within the housing;
- a sealing member fixed to the stem and shiftable between a first position in which the sealing port is open and a second position in which the sealing port is closed;
- a removable cover for said housing; and
- the housing comprises means for releasably retaining a partition plate for sealingly dividing the outlet chamber so as to form a second control chamber at a second side of the diaphragm and comprising a second control port, the partition plate having an opening for slidingly and sealingly supporting the stem;
- the arrangement being such that the valve is operable in either of two operative modes:
  i) where the partition plate is removed from the housing and the second control port is sealed, whereby a control signal applied via the first control port applies on the diaphragm a force greater than a force applied by the pressurized fluid on the second side of the diaphragm, entailing displacement of the diaphragm together with the sealing member into the second position, whereas upon decreasing the pressure in the first control chamber, the pressurized fluid in the inlet port applies force on the sealing member so as to displace it into the first position;
  ii) where the partition plate is retained within the housing and the second control port is aired, whereby a control signal applied via the first control port generates on the one side of the diaphragm a force greater than the force applied on the sealing member by the pressurized fluid flowing through the supply line, causes axial displacement of the diaphragm entailing displacement of the sealing member into the second position, whereas upon decreasing the force applied on the one side of the diaphragm the sealing member is displaced into the first position by one of control signal generating force applied on the second side of the diaphragm via the second control port, and by the pressurized fluid in the inlet port applying pressure on the sealing member.

In the control valve according to the present invention, the control signal is a hydraulic or a pneumatic signal.

By one application of the invention, the partition plate is supported within the housing over a lateral inwardly projecting support and is retained by a spring ring fittable within a suitable groove within the housing. Alternatively, the partition plate is retained by a plurality of segments secured within the groove. Preferably, the partition plate comprises at least one seal for sealing between the plate and the housing and at least one seal for sliding sealing between the plate and the stem.

By a preferred application of the present invention, the sealing port comprises a sealing seat and the sealing member comprises a resilient gasket for sealing engagement with the sealing seat of the sealing port.

Still preferable, a central portion of the diaphragm is rigid, the rigid portion having a cross-section area equal or greater than the cross-section area of the sealing member. The rigid portion of the diaphragm is preferably obtained by a disk fixed at each side of the diaphragm.

According to another application of the invention, the cover of the housing comprises an aperture for projection of a position indicator signalling the position of the sealing member, the position indicator being coupled to an upper end of the stem.

By still another embodiment, at the single chamber configuration of the valve, the sealing member is biased into the second position by a spring bearing at one end against the housing and at an opposed end against the first face of the diaphragm. Alternatively, when the valve according to the present invention is in the double chamber valve configuration, the sealing member is biased into the second position by a spring bearing at one end against the partition plate and at an opposed end against the sealing member, wherein fluid flow in a direction from the outlet port to the inlet port entails displacement of the sealing member into the second position.

Preferably, the diaphragm is retained between flanged portions of the housing and the cover. Additionally, the first control chamber further comprises support ribs for restricting displacement of the diaphragm when the sealing member is displaced into the first position.

By a preferred application of the invention, the sealing member comprises a positioning member for ensuring coaxial displacement thereof with respect to the sealing port. By one embodiment, the positioning member is at least three studs projecting downward from a bottom surface of the sealing member fittable within the sealing port. However, the positioning member may be, for example, a downward extension coaxially projecting bellow the sealing member and adapted for sliding engagement with a suitable receiving member coaxial within the sealing port, either projecting from a bottom portion of the housing or supported by ribs at the sealing port.

By still a preferred application, the housing and cover comprise inclined, converging walls terminating at the flanged portions, the inclined walls adapted for supporting the peripheral portion of the diaphragm.

Still preferably, the housing comprises a drain port at a lowermost portion thereof.

BRIEF DESCRIPTION OF THE DRAWINGS

For better understanding, the invention will now be described by way of example only, with reference to the accompanying drawings, in which.

DETAILED DESCRIPTION OF PREFERRED EMBODIMENTS

Figure 1:
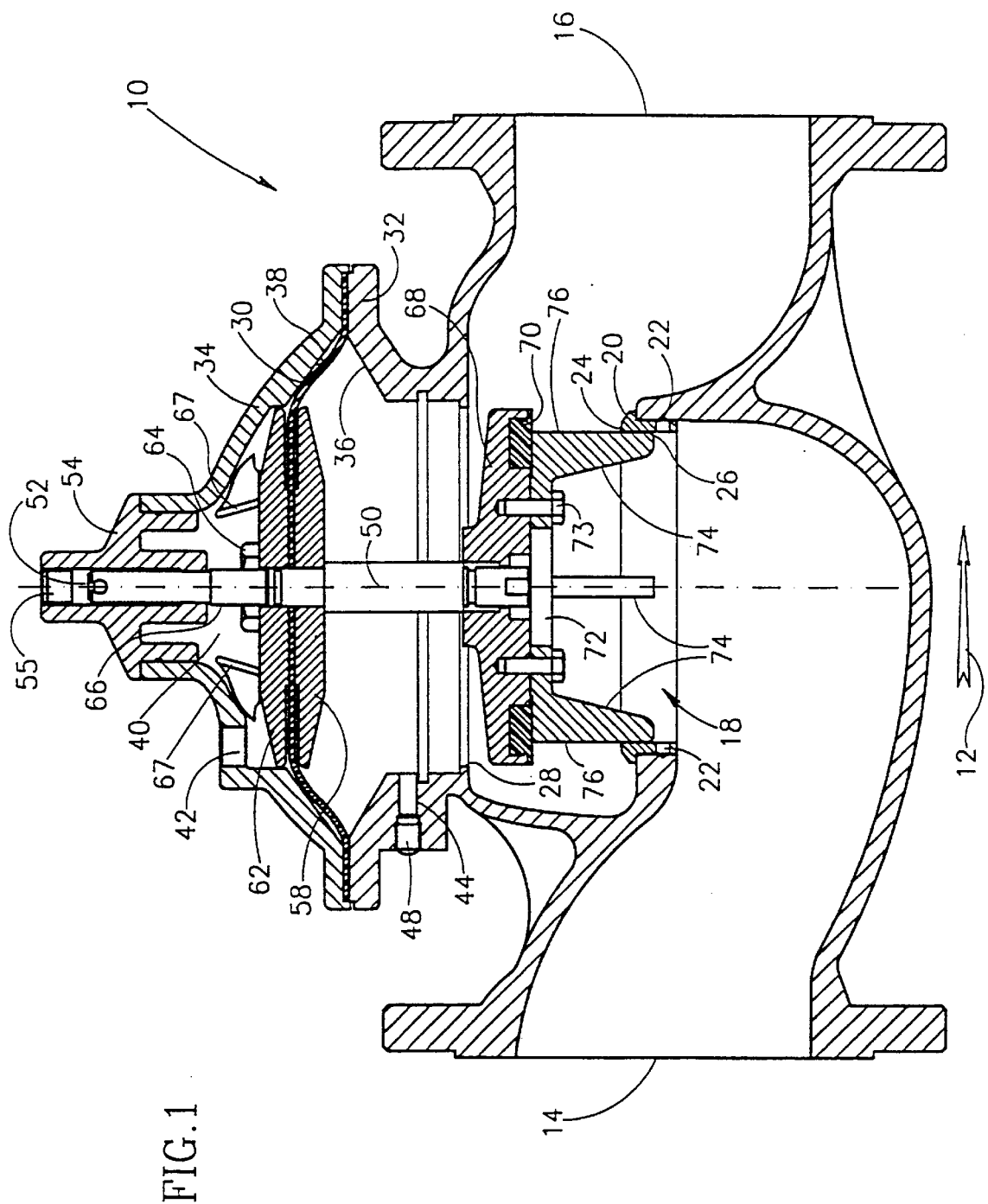
Fig. 1 is a cross-sectional view of the valve according to the present invention in a first operative mode, the valve being in the open position.
Figure 2:
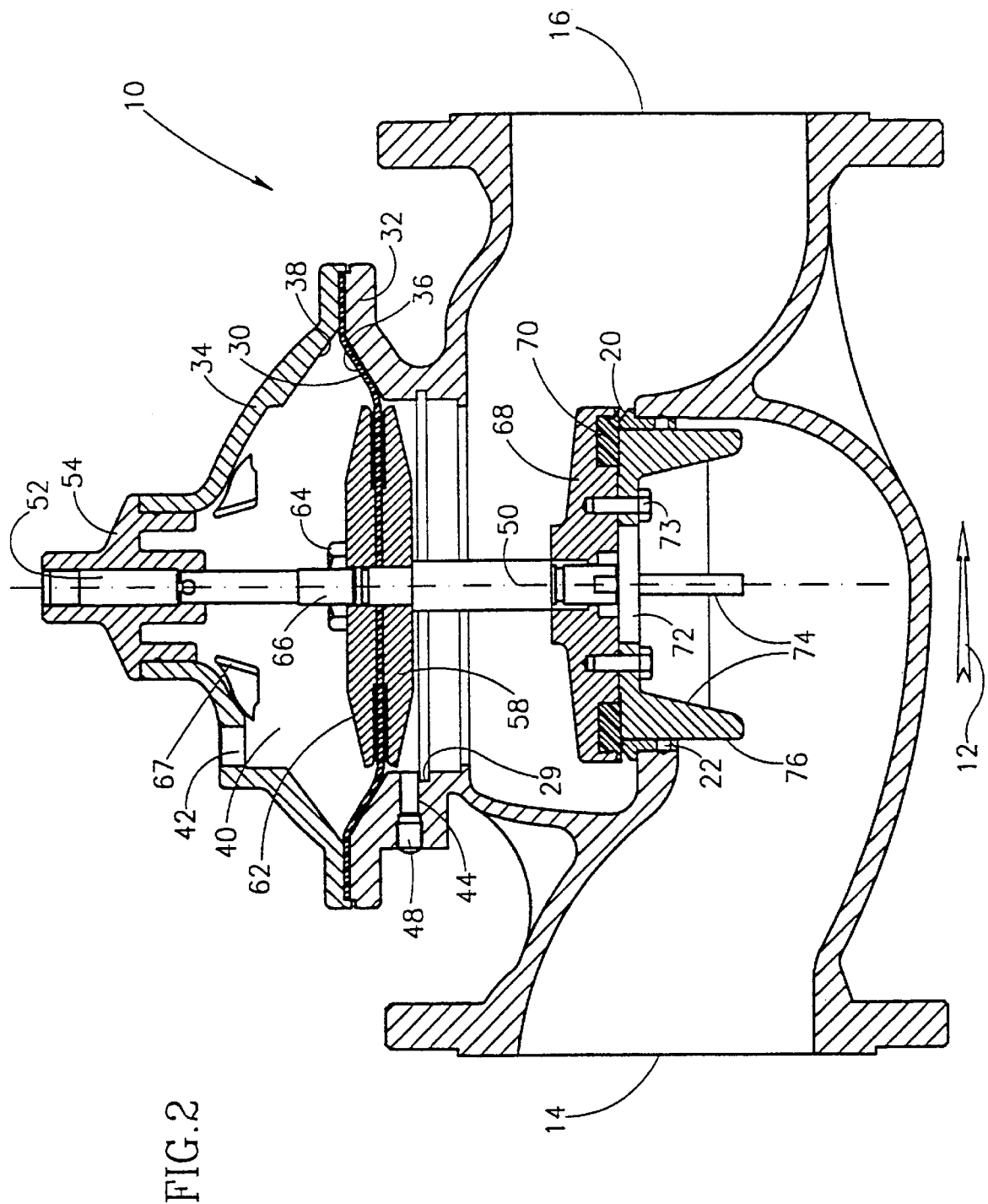
FIG. 2 is a cross-sectional view of the valve of FIG. 1, the valve being in the closed position.

Attention is first directed to FIGS. 1 and 2 of the drawings illustrating the control valve according to the invention in a so-called single chambered configuration, in which the valve consists of a housing generally designated 10 wherein the flow direction is represented by arrow 12, from a flanged inlet port 14 connectable to a pressurized liquid supply line (not shown) and out via a flanged outlet port 16 connectable to an outlet line (not shown).

Intermediate the inlet port 14 and the outlet port 16, there is provided a sealing port 18 having a circular cross-section and provided with a seat member 20 fixed to the housing at 22. The seat member 20 comprises a top seat sealing surface 24 and an essentially vertical cylindric wall 26. The housing further comprises a necking portion 27 with an inwardly projecting annular shoulder 28 and an annular groove 29, the purpose of which will be become apparent hereinafter with reference to FIGS. 4 and 5.

A flexible diaphragm 30 is clamped between a flanged portion 32 of the housing and a flanged cover member 34 secured to the housing by bolts (not shown), both of which comprise an inclined surface 36 and 38 respectively, the inclined surfaces converging towards one another and adapted for supporting the diaphragm 30 in either a first position shown in FIG. 1 or in a second position shown in FIG. 2, as will hereinafter be explained.

A first control chamber 40 is formed above the diaphragm 30 with a control port 42 for connecting to a control line (not shown). A second control port 44 is provided below the diaphragm 30 which in the embodiment of FIGS. 1 and 2 is sealed by a removable screw-threaded plug 48.

The diaphragm is fixedly attached to a stem 50, the stem 50 being slidingly supported at its top end within a bore 52 of a screw-threaded cap 54 fitted to the cover 34, the cap having a top seal 55.

As can further be seen in FIGS. 1 and 2, a central portion of the diaphragm 30 is supported between a first rigid disk 58 below the diaphragm and mounted on a shoulder 60 of the stem 50, and a second rigid disk 62 mounted above the diaphragm 30, the disks clampingly supporting the diaphragm by a nut 64 fastened to a threaded portion 66 of the stem 50. In the first chamber 40 there are provided several ribs 67 for limiting upward displacement of the diaphragm 30 with associated parts, where downward displacement is limited by the sealing member 68 engaging the seal ring 20.

A sealing member 68 is retained at a bottom end of the stem 50 and it comprises at a bottom face thereof a sealing gasket 70 adapted for sealing engagement with the seat sealing surface 24 of the seat member 20. A plate 72 attached by bolts 73 to the bottom surface of the sealing member 68, with three downwardly projecting ribs 74 each having vertical peripheral walls 76 adapted for snugly fitting into the cylindric wall 26 of the seat member 20, for concentrically positioning the seal member with respect to the seat member.

Referring now to Fig. 1, the control valve is in the so-called open position in which the control port 42 is aired and pressurized liquid flows from the inlet port 14, via the sealing port 18 and out through the outlet port 16.

However, when it is required to close the valve, a hydraulic or a pneumatic control signal is introduced via the control port 42 by way of introducing hydraulic or pneumatic pressure into the first chamber 40, thereby applying force on the top surface of the diaphragm 30 which force is greater than the force applied by the pressurized fluid on the second (bottom) face of the diaphragm 30, thus causing the diaphragm to move downward to the position of FIG. 2, along with the associated stem 50, entailing closing of the sealing port 18 by the sealing member 68. Upon airing of the control port 42 (by airing or by connecting it to a low pressure zone such as to the outlet line), the pressurized fluid flowing through the inlet port 14 applies force on the bottom face of the sealing member 68, thus causing raising of the sealing member 68 with the associated stem and diaphragm, back to the open position, as in FIG. 1.

Figure 3:
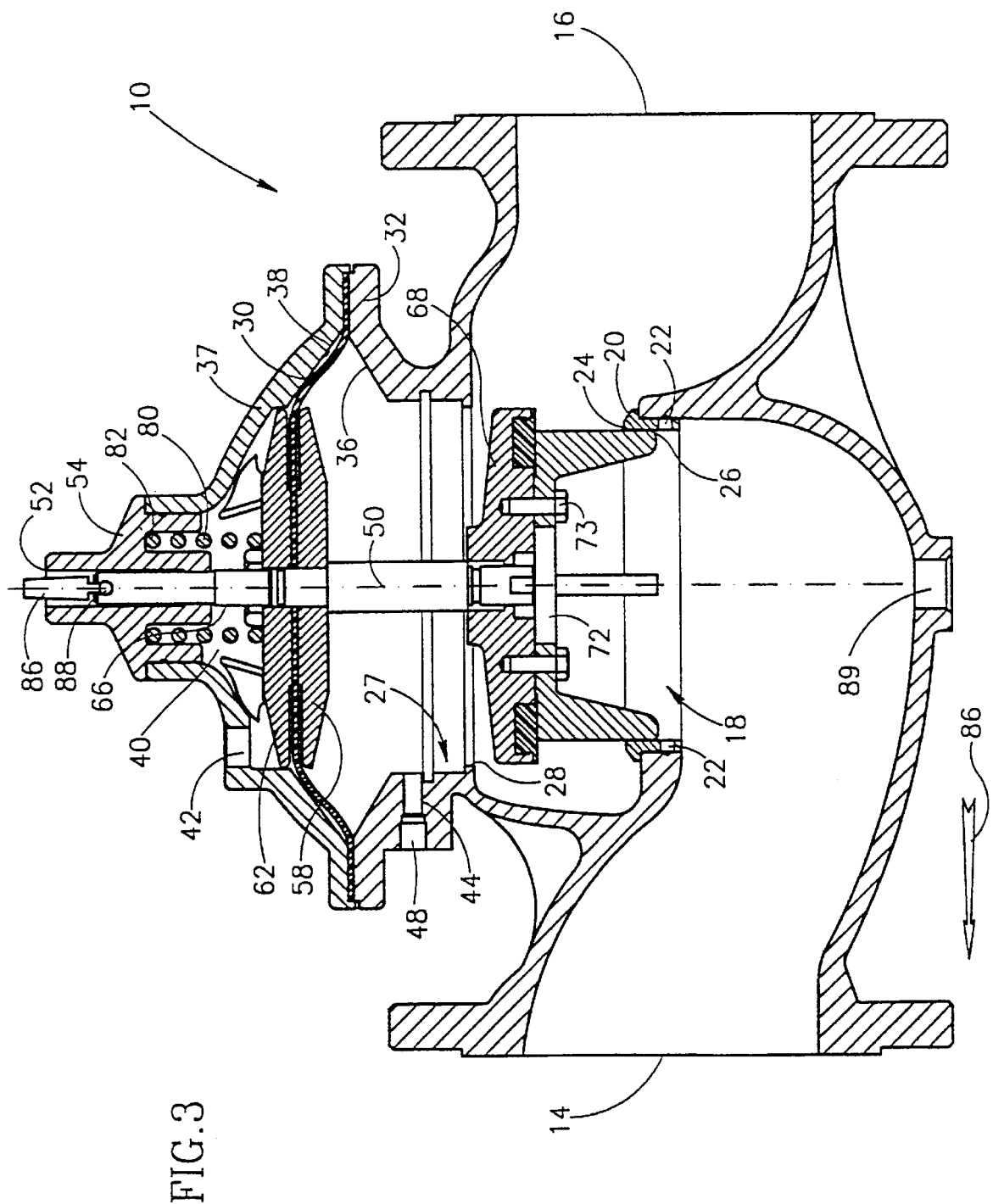
FIG. 3 is a cross-sectional view of the valve according to the present invention in the first operative mode, in the open position, the valve further comprising a biasing spring and a position indicator.

Reference is now made to FIG. 3, illustrating a valve which is similar to the valve described with reference to FIGS. 1 and 2. However, a compression spring 80 bearing at a bottom end against the top disk 62 and at a top end received within a groove 82 of the cap 54, thus biasing the diaphragm 30 with associated sealing member 68 downward, to the sealing position. The design of the spring 80 is such that it applies force which is lesser than the hydraulic force applied by the liquid on the bottom face of the sealing member. A control signal generating on the top face of the diaphragm a force equal to or grater than that applied on the bottom face of the diaphragm by the pressurized fluid, entailing displacement of the diaphragm with associated members to the sealing position. Furthermore, upon decrease of pressure in the inlet line bellow the a predetermined threshold, the valve will spontaneously close owing to the initial force applied by the spring.

In FIG. 3 seal 55 (seen in FIGS. 1 and 2) is removed from cap 54 and a position indicator 86 is attached at 88 to the top end of the stem 50, the position indicator being sealingly and slidably retained within the opening 52 of the cap 54. The arrangement is such that when the valve is in the open position (as in FIGS. 1 and 3) the position indicator 86 projects from the opening 52 of the cap 54, whereby indication is provided that the valve is open. As can readily be understood, when the valve is in the closed position, the position indicator 86 is conceived within the cap 54 and does not project therefrom or projects to a lower extent (these positions are not shown).

Also seen in FIG. 3, the housing 10 of the valve comprises at a lowermost portion thereof a drain opening 89 for draining the valve, the opening being sealable by a plug (not shown).

Figure 4:
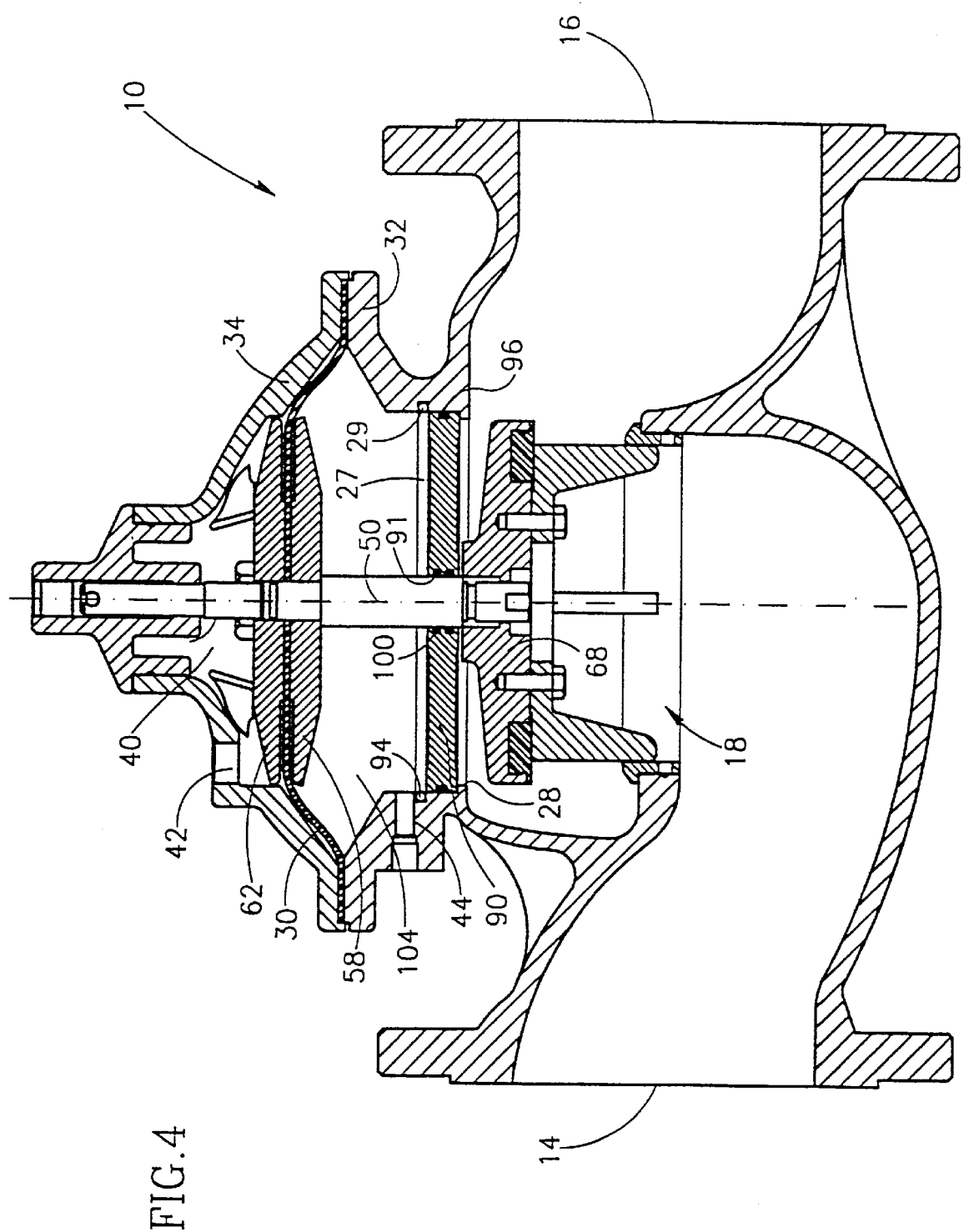
FIG. 4 is a cross-sectional view of the valve according to the present invention in the second operative mode, the valve being in the open position.
Figure 5:
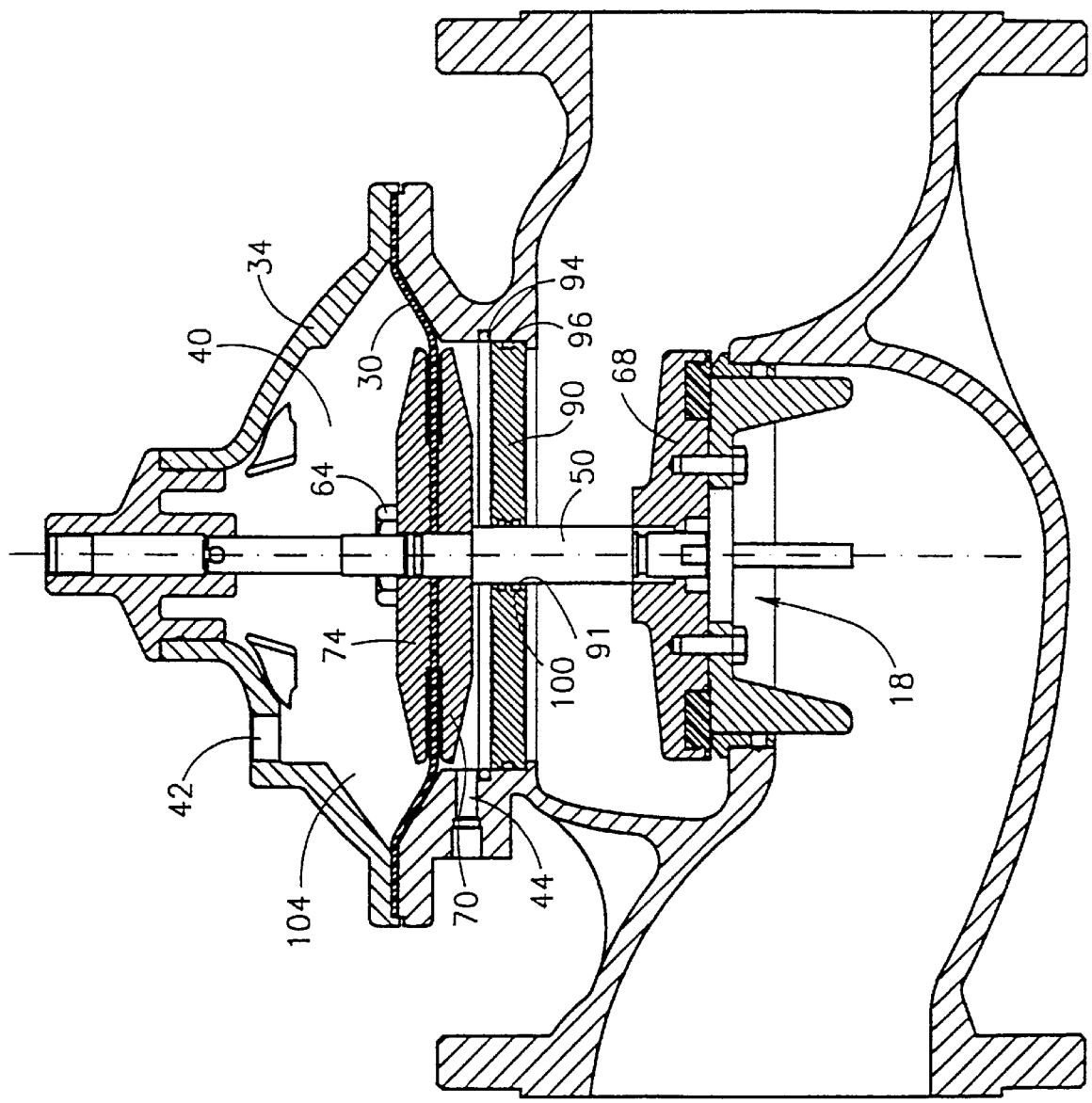
FIG. 5 is a cross-sectional view of the valve of FIG. 4, the valve being in the closed position.

Attention is now directed to FIGS. 4 and 5 of the drawings illustrating a second embodiment of the present invention in which the control valve is converted into a so-called double chambered hydraulic control valve. For sake of convenience, elements similar to those of the previous embodiment are referred to by the same reference numerals.

In order to convert the single chambered control valve of Figs. 1 and 2 into a double chamber control valve, the cover 34 and the diaphragm 30 together with disks 58 and 62 are removed from the housing 10 without removing the stem 50. Then a circular partition plate 90 with a central opening 91 is mounted into the housing 10 over stem 50 and placed on the annular shoulder 28, and then retained in place by a spring ring 94 snapingly received within groove 29 of the housing. The partition plate 90 comprises a resilient seal 96 at its periphery for sealing between the partition plate 90 and the necking portion 27 of the housing 10. A couple of seals 100 is provided between the opening 91 of the plate 90 and the stem 50, whereby a second, essentially sealed chamber 104 is formed below the diaphragm 30, the second chamber comprising the second control port 44.

The arrangement of the double chambered control valve is such that at an initial stage (as in FIG. 4), both the first and second control ports 42 and 44 respectively, are vented, whereby the diaphragm 30 is urged into its upward position by the pressurized fluid applying pressure on the bottom surface of the seal member 68. In this position fluid flows from inlet 14 via the sealing port 18 and out through the outlet port 16.

However, in order to close the valve, the second control port remains vented and hydraulic pressure is applied into the first chamber 40 via the first control port 42, whereby the diaphragm 30 with associated disks 58 and 62 is urged downwardly, entailing downward displacement of the stem 50 with the associated sealing member 68, the later sealingly engaging, the sealing ring of the sealing port 18, as seen in Fig,. 5.

Opening the valve is carried out by venting, the first chamber 40 via control port 42, whereby, as already explained hereinabove, the pressurized fluid ingressing the vale will cause upward displacement of the sealing member 68 with the associated stem 50, resulting in upward displacement of the diaphragm 30 to the position of FIG. 4. However, in case the ingressing fluid is at essentially low pressure, where it is required to overcome some friction forces, or when a spring, is provided (similar to the arrangement as explained with reference to FIG. 3), then the diaphragm 30 should be positively displaced upwardly by airing control port 42 of the first chamber 40 and applying pressure into the second chamber 104 via control port 44, as can readily be understood.

Figure 6:
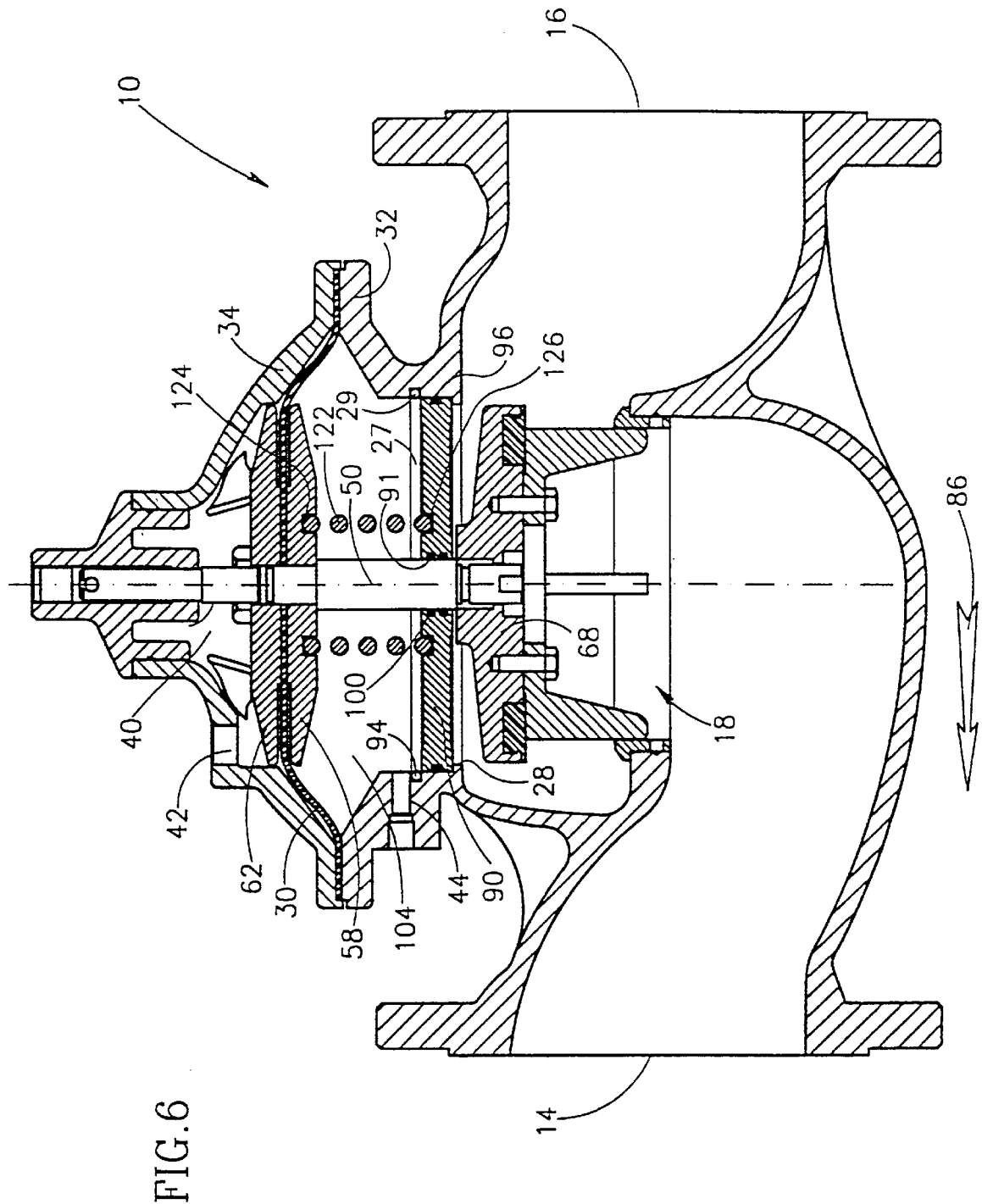
FIG. 6 is a cross-sectional view of the valve according to the present invention in the second operative mode, the valve comprising a second mode of biasing spring.

FIG. 6 of the drawings illustrates a second way for biasing the sealing member into the second position. According to this embodiment, a top end of biasing spring 122 is received within an annular groove 124 at a bottom face of the diaphragm supporting disc 58 and a bottom end of the spring is received within an annular groove 126 on a top face of the partition plate 90, biasing the later to the second position.

Figure 7:
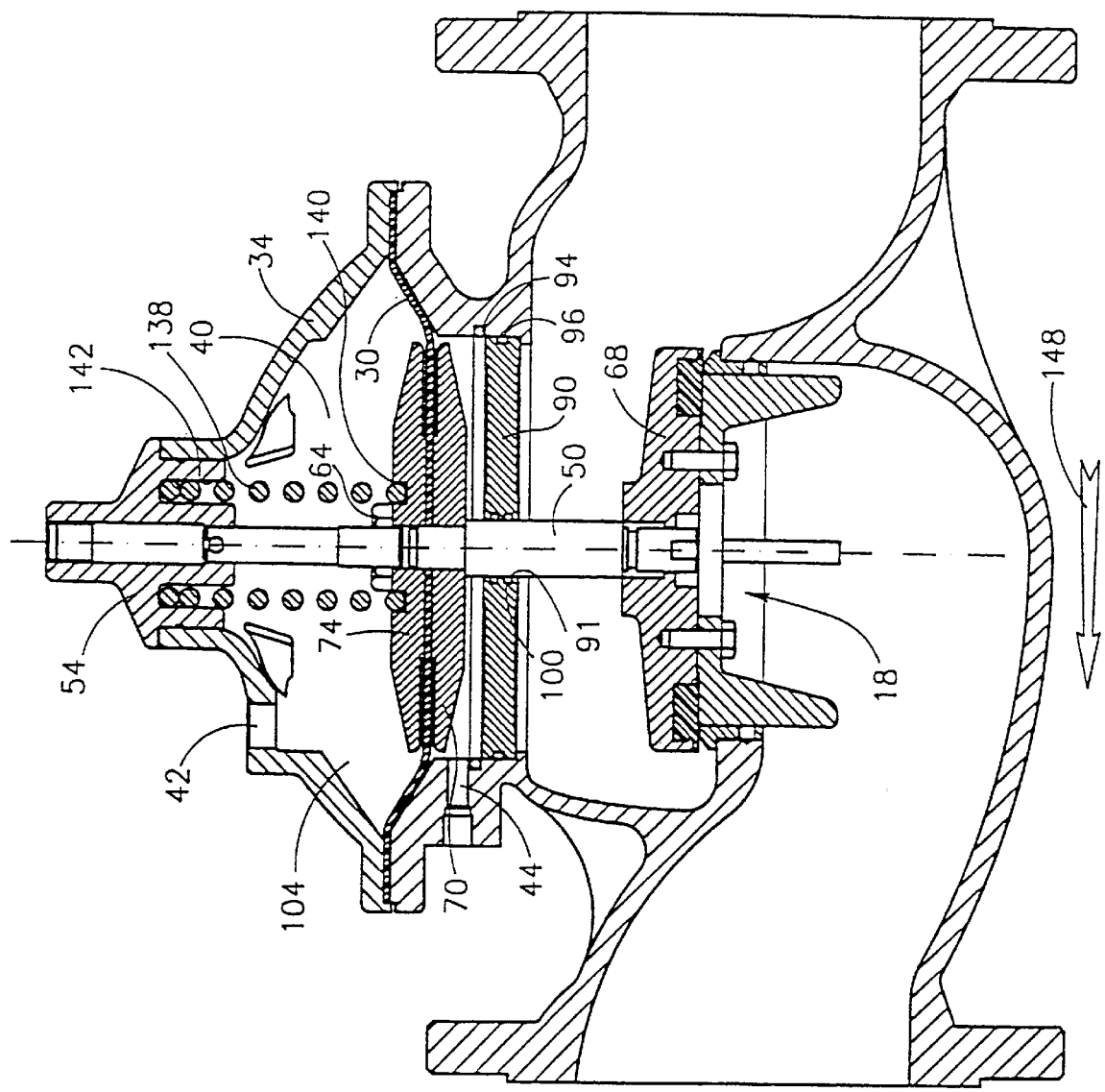
FIG. 7 is a cross-sectional view of the valve according to the present invention in the second operative mode and further comprising a biasing spring, the valve serving as a check valve.

Attention is now directed to FIG. 7, wherein a double chamber-type control valve is provided with a compression spring 138 bearing at a bottom end against groove 140 of the top disk 74 and at a top end received within a groove 142 of the cap 54, thus biasing the diaphragm 30 with associated sealing member 68 downward, to the sealing position. The arrangement is such that in conditions of reverse liquid flow, i.e. liquid flowing in a direction of arrow 148, from the outlet port 16 towards the inlet port 14, the additional force of the liquid applying hydraulic pressure above the sealing member 68 (in the open position) entails displacement of the sealing member 68 into the so-called closed position, as in FIG. 7.

It should be obvious to a skilled person that converting the control valve according to the present invention from a single chamber valve to a double chamber valve is reversible and at any time the partition plate 90 may be removed from the housing by simply opening the spring ring 94, thus converting the valve back to a single chambered control valve. It should further be realized that both the single chambered valve and the double chambered control valve may be provided with a spring for biasing the diaphragm to the closed position, as explained with reference to FIGS. 3, 6 and 7. Furthermore, the valve of either embodiment may be provided with a position indicator as explained with reference to FIG. 3.

Still furthermore, the positioning member may be, for example, a downward extension coaxially projecting below the sealing member and adapted for sliding engagement with a suitable receiving member coaxial within the sealing port, either projecting from a bottom portion of the housing or supported by ribs at the sealing port. Additionally, the partition plate may be retained by a plurality of segments secured within the groove of the housing.

It should be understood that while a hydraulic control signal may be more suitable, a pneumatic control signal may just as well be used, mutatis mutandis.

We claim:

1. A hydraulic control valve comprising:
   a housing (10) having an inlet port (14) for connecting to a pressurized fluid supply line, and an outlet port (16) for connecting to an outlet line;
   a sealing port (18) intermediate the inlet port (14) and the outlet port (16), dividing the housing (10) into an inlet chamber and an outlet chamber;
   a diaphragm (30) sealingly dividing the outlet chamber and forming a first control chamber (40) at one side of the diaphragm (30) and comprising a first control port (42);
   a stem (50) articulately supporting the diaphragm (30) and being axially displaceable within the housing (10), the stem being axially supported at a top end and at a bottom end thereof, said bottom end being supported within the sealing port and adapted for co-axial displacement with respect thereto;
   a rigid sealing member (68) fixed at said bottom end of the stem (50) and shiftable between a first position in which the sealing port (18) is open and a second position in which the sealing port (18) is closed;
   a removable cover (34) for said housing (10);
   wherein the housing (10) comprises means (28, 29) for releasably retaining a partition plate (90) for sealingly dividing the outlet chamber so as to form a second control chamber at a second side of the diaphragm (30) and comprising a second control port (44), the plate (90) having an opening (91) for slidingly and sealingly receiving the stem (50) and said plate (90) being removable from within said housing (10) without changing the height of said housing (10);
   the arrangement being such that the valve is operable in either of two operative modes:
      i) where the partition plate (90) is removed from the housing (10) and the second control part (44) is sealed, whereby a control signal applied via the first control port (42) applies on the diaphragm (30) a force greater than a force applied by the pressurized fluid on the second side of the diaphragm (30), entailing displacement of the diaphragm (30) together with the sealing member (68) into the second position, whereas upon decreasing the pressure in the first control chamber (42), the pressurized fluid in the inlet port (14) applies force on the sealing member (68) so as to displace it into the first position;
      ii) where the partition plate (90) is retained within the housing (10) and the second control port (44) is aired, whereby a control signal applied via the first control port (42) generates on the one side of the diaphragm (30) a force greater than the force applied on the sealing member (68) by the pressurized fluid flowing through the supply line, causes axial displacement of the diaphragm (30) entailing displacement of the sealing member (68) into the second position, whereas upon decreasing the force applied on the one side of the diaphragm (30) the sealing member (68) is displaced into the first position by one of control signal generating force applied on the second side of the diaphragm (30) via the second control port (44), and by the pressurized fluid in the inlet port (14) applying pressure on the sealing member (68).

2. A control valve according to claim 1, wherein the control signal is selected from one of a hydraulic signal and a pneumatic signal.

3. A control valve according to claim 1, wherein the partition plate is supported within the housing over a lateral projecting support and retained by a spring ring fittable within a suitable groove in the housing.

4. A control valve according to claim 3, wherein the partition plate is sealingly retainable in the housing and the stem is sealingly slidable within the partition plate.

5. A control valve according to claim 4, wherein the partition plate comprises at least one first seal for sealing between the plate and the housing and at least one seal for sliding sealing between the plate and the stem.

6. A control valve according to claim 3, wherein the sealing port is encircled by a sealing ring.

7. A control valve according to claim 6, wherein the sealing member comprises a resilient gasket for sealing engagement with the sealing ring of the sealing port.

8. A control valve according to claim 1, wherein a central portion the diaphragm is rigid; the rigid portion having a cross-section area equal or greater than the cross-section area of the sealing member.

9. A control valve according to claim 1, wherein the cover of the housing is provided with a bore for slidingly supporting a top end of the stem projecting above the first side of the diaphragm.

10. A control valve according to claim 9, wherein the cover has an aperture for a position indicator to signal the position of the sealing port.

11. A control valve according to claim 1, wherein the sealing member is biased into the second position.

12. A control valve according to claim 11, wherein the force applied on the diaphragm at the first control chamber for displacing the diaphragm into the second position is equal to the force applied on a bottom face of the sealing member by the pressurized fluid.

13. A control valve according to claim 11, wherein the sealing member is biased into the second position by a spring bearing at one end against the housing and at an opposed end against the first face of the diaphragm.

14. A control valve according to claim 11, wherein the sealing member is biased into the second position by a spring bearing at one end against the partition plate and at an opposed end against the sealing member.

15. A control valve according to claim 1, wherein the diaphragm is retained between flanged portions of the housing and the cover.

16. A control valve according to claim 1, wherein the first control chamber comprises support ribs for restricting displacement of the diaphragm.

17. A control valve according to claim 14, wherein the housing and the cover comprise inclined, converging walls terminating at the flanged portions, the inclined walls adapted for supporting the peripheral portion of the diaphragm.

18. A control valve according to claim 1, wherein the sealing member comprises a positioning member for ensuring coaxial displacement thereof with respect to the sealing port.

19. A control valve according to claim 17, wherein the positioning member is at least three studs projecting from a bottom surface of the sealing member fittable within the sealing port.

20. A control valve according to claim 1, wherein the housing further comprises a drain port at a lowermost portion thereof.

21. A control valve according to claim 11, wherein in the second operative mode fluid flow in a direction from the outlet port to the inlet port entails displacement of the sealing member into the second position.

22. In a hydraulic valve comprising:

a housing (10) having an inlet port (14) for connecting to a pressurized fluid supply line, and an outlet port (16) for connecting to an outlet line;

a sealing port (18) intermediate the inlet port (14) and the outlet port (16), dividing the housing (10) into an inlet chamber and an outlet chamber;

a diaphragm (30) sealingly dividing the outlet chamber and forming a first control chamber (40) at one side of the diaphragm (30), and a first control port (42) for the first control chamber (40);

an axially movable stem (50) having upper and lower ends;

a rigid sealing member (68) fixed to said lower end of said stem (50) and axially movable with said stem between a first position in which the sealing port (18) is open and a second position in which the sealing port (18) is closed; and a removable cover (34) for said housing (10);

the improvement wherein:

the stem (50) is slidably supported at both its said upper and lower ends so as to permit only said axial movement of said stem; the improvement further comprising:

supporting structure for a partition plate (90) provided within said housing at a position between said diaphragm (30) and said rigid sealing member (68), said supporting structure being adapted to hold the partition plate to form a second control chamber at a second side of the diaphragm (30), said supporting structure comprising a lateral projecting support (28) for retaining a first side of the partition plate, and a retainer (29, 94) for releasably locking the partition plate in position within said housing to form the second control chamber; and a second control port (44) in said housing at a position between said diaphragm and said retainer for the partition plate.

* * * * *